United States Patent
Lu et al.

(10) Patent No.: US 8,625,271 B2
(45) Date of Patent: Jan. 7, 2014

(54) MOUNTING APPARATUS FOR PCI CARD

(75) Inventors: Wen-Hu Lu, Shenzhen (CN); Zhan-Yang Li, Shenzhen (CN); Po-Wen Chiu, Tu-Cheng (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 85 days.

(21) Appl. No.: 13/427,820

(22) Filed: Mar. 22, 2012

(65) Prior Publication Data

US 2012/0327616 A1 Dec. 27, 2012

(30) Foreign Application Priority Data

Jun. 24, 2011 (CN) .......................... 2011 1 0173111

(51) Int. Cl.
*G06F 1/16* (2006.01)
*H05K 7/14* (2006.01)
*H05K 5/00* (2006.01)

(52) U.S. Cl.
USPC ................. 361/679.32; 361/679.31; 361/801; 361/759

(58) Field of Classification Search
USPC ....................... 361/679.31, 679.32, 801, 802, 361/807–810, 752, 790, 747, 759; 439/160
See application file for complete search history.

(56) References Cited

U.S. PATENT DOCUMENTS

| | | | | | |
|---|---|---|---|---|---|
| 5,544,006 | A | * | 8/1996 | Radloff et al. | 361/679.32 |
| 6,950,313 | B1 | * | 9/2005 | Shih | 361/759 |
| 6,960,720 | B2 | * | 11/2005 | Wen-Lung | 174/50 |
| 7,012,813 | B2 | * | 3/2006 | Wang et al. | 361/801 |
| 7,310,241 | B2 | * | 12/2007 | Peng et al. | 361/801 |
| 7,561,440 | B2 | * | 7/2009 | Dai | 361/801 |
| 7,855,898 | B2 | * | 12/2010 | Tang | 361/801 |
| 2009/0253285 | A1 | * | 10/2009 | Yang | 439/312 |

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

A mounting apparatus for a PCI card includes an enclosure, a mounting bracket configured to secure a first end of the PCI card, a securing bracket mounted on the bottom panel, and a securing member. The securing bracket includes a bracket body and an engaging plate extending from the bracket body. The securing member includes a pressing element pivotably mounted to the securing bracket and a securing element pivotably mounted on the pressing element. The securing element is configured to engage the engaging plate to enable the pressing element to press the second end to locate the second end between the bracket body and the pressing element.

11 Claims, 6 Drawing Sheets

MOUNTING APPARATUS FOR PCI CARD

BACKGROUND

1. Technical Field

The disclosure generally relates to mounting apparatuses, especially, to a mounting apparatus for a peripheral component interconnect (PCI) card.

2. Description of Related Art

PCI cards function as network cards, monitor cards, sound cards, and the like in a computer. Known methods for mounting PCI cards involve screws and screwdrivers in a tedious endeavor, activities often result in screws being lost. A screw falling on a printed circuit board (PCB) in a computer can result in a computer malfunction and/or damage to the PCB.

Thus, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
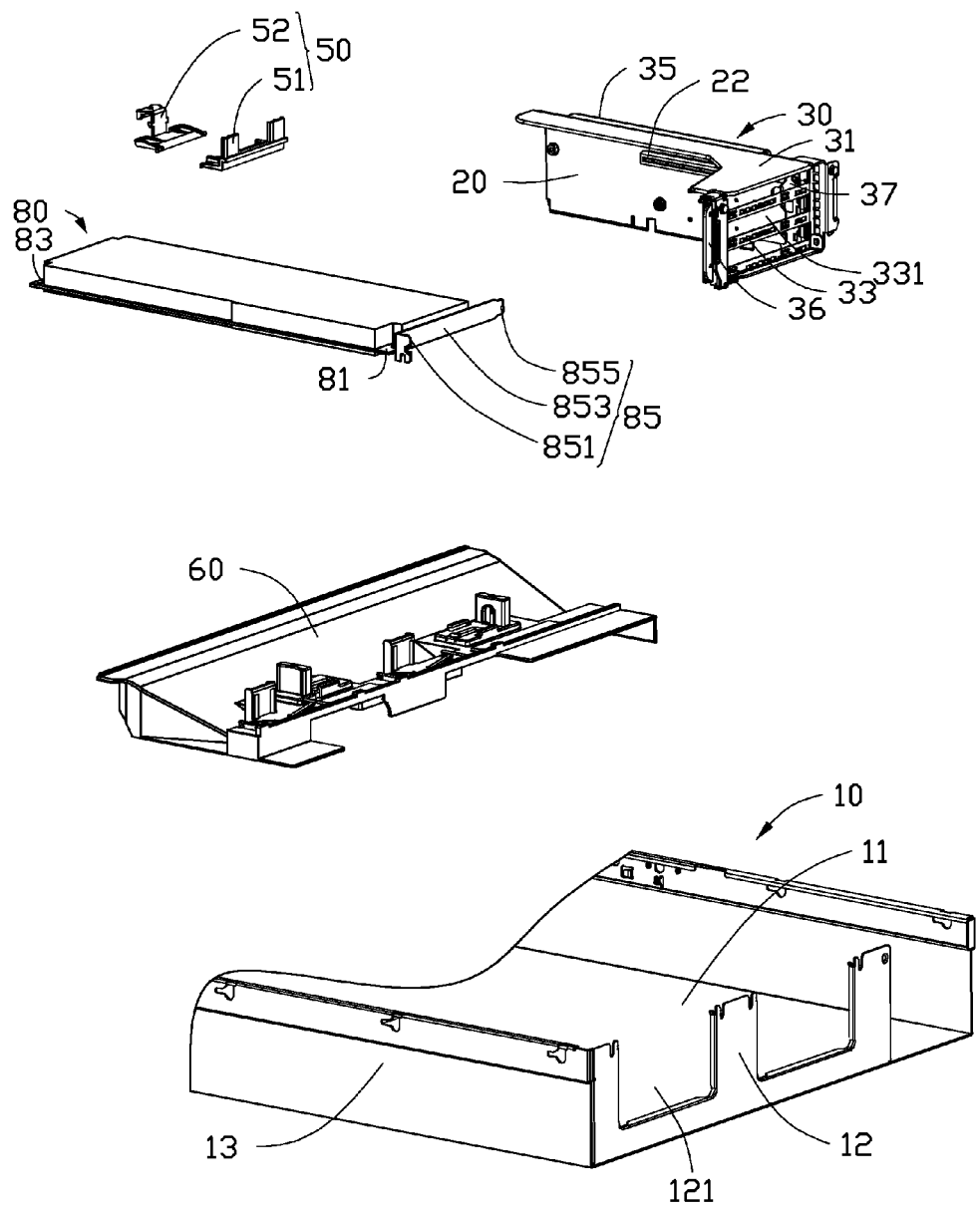
FIG. 1 is an exploded, isometric view of an embodiment of a mounting apparatus for PCI cards.

Referring to FIG. 1, an embodiment of a mounting apparatus for a PCI card 80 is shown. The mounting apparatus includes an enclosure 10, a mounting bracket 30 mounted on the PCI card 80, a securing member 50, and a securing bracket 60 mounted in the enclosure 10.

The PCI card 80 includes a first end 81 and a second end 83. The first end 81 is mounted to a mounting piece 85. The mounting piece 85 includes a mounting portion 851, a main portion 853 extending from the mounting portion 851, and an inserting portion 855 extending from the main portion 853. The PCI card 80 includes an inserting end (not shown) close to the first end 81.

The enclosure 10 includes a bottom panel 11, a rear panel 12 extending from the bottom panel 11, and a side panel 13 extending from the bottom panel 11. The rear panel 12 and the side panel 13 are substantially perpendicular to the bottom panel 11. A mounting opening 121 is defined in the rear panel 12.

The mounting bracket 30 includes a top plate 31, a rear plate 33, and a side plate 35. The rear plate 33 defines a plurality of elongated slots 331. The rear plate 33 includes a blocking tab 36. The side plate 35 defines a plurality of openings 37 corresponding to the inserting portion 855 of the mounting piece 85. A converting card 20 is mounted to the side plate 35. The converting card 20 defines a converting slot 22 corresponding to the inserting end.

Figure 2:
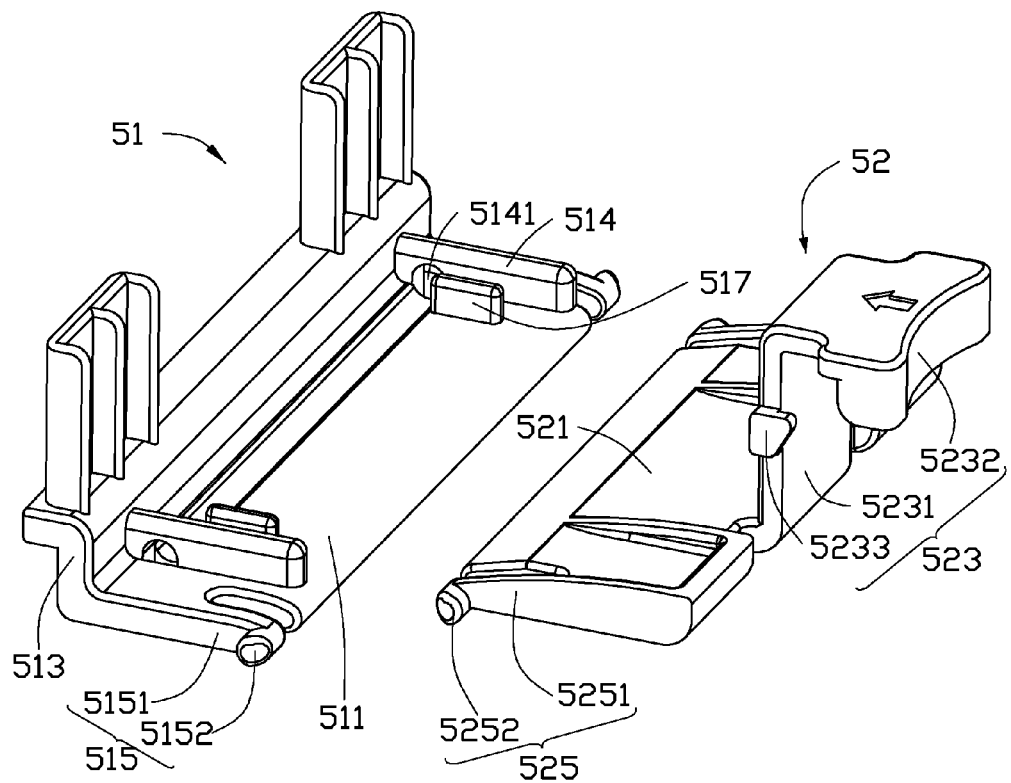
FIG. 2 is an isometric view of a securing member of the mounting apparatus of FIG. 1.
Figure 3:
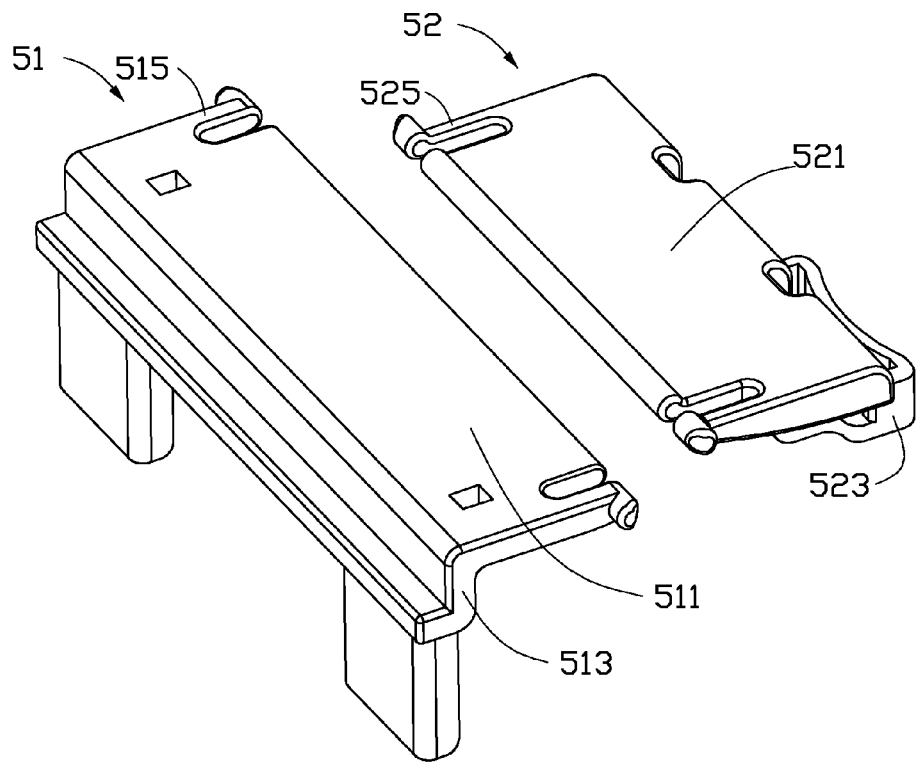
FIG. 3 is similar to FIG. 2, but viewed from another aspect.

Referring to FIGS. 2 and 3, the securing member 50 includes a pressing element 51 and a securing element 52. The pressing element 51 includes a first base panel 511 and a pressing portion 513 extending from the first base panel 511. The pressing element 51 further includes two first pivot portions 515 extending from opposite ends of the first base panel 511. Each of the two first pivot portions 515 includes a first connecting arm 5151 extending from the first base panel 511 and a first pivot post 5152 extending from the first connecting arm 5151. The pressing element 51 further includes two mounting tabs 514 extending from the first base panel 511. Each of the two mounting tabs 514 defines a pivot hole 5141. The pressing element 51 further includes two positioning portions 517 extending from the first base panel 511. The securing element 52 includes a second base panel 521 and a securing portion 523 extending from the second base panel 521. The securing portion 523 is L-shaped. The securing element 52 further includes two second pivot portions 525 extending from opposite ends of the second base panel 521. Each of the two second pivot portions 525 includes a second connecting arm 5251 extending from the second base panel 521 and a second pivot post 5252 extending from the second connecting arm 5251. The second pivot posts 5252 correspond to the pivot hole 5141. The securing portion 523 includes a connecting portion 5231 extending perpendicularly from the second base panel 521, a handle portion 5232 extending from the connecting portion 5231, and two engaging protrusions 5233 extending from opposite sides of the connecting portion 5231.

Figure 4:
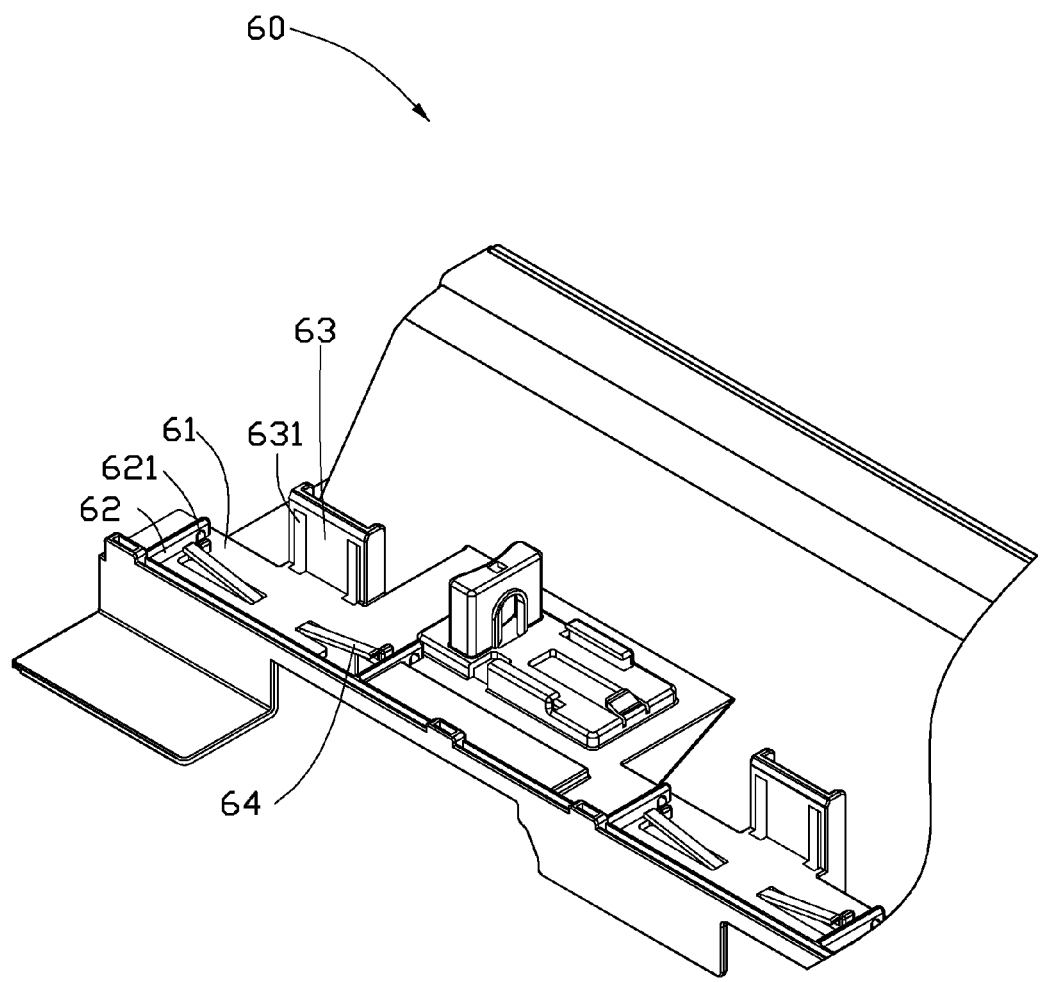
FIG. 4 is an isometric view of the securing bracket of the mounting apparatus of FIG. 1.
Figure 5:
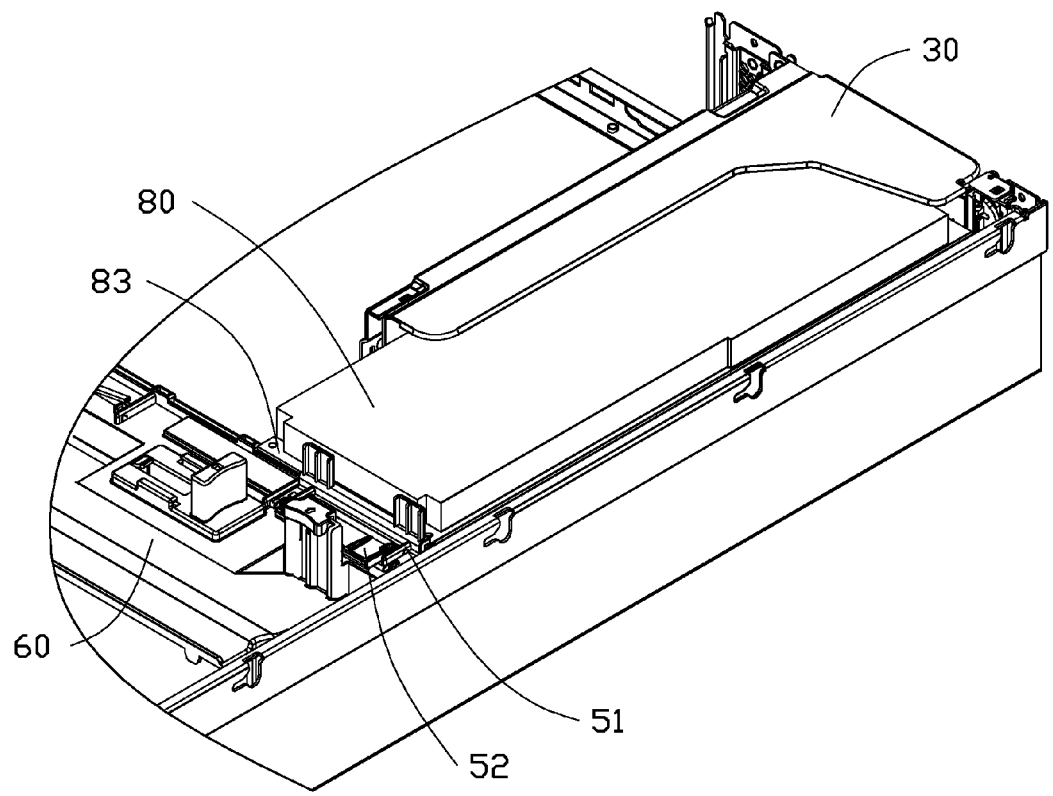
FIG. 5 is an assembled view of the mounting apparatus of FIG. 1.
Figure 6:
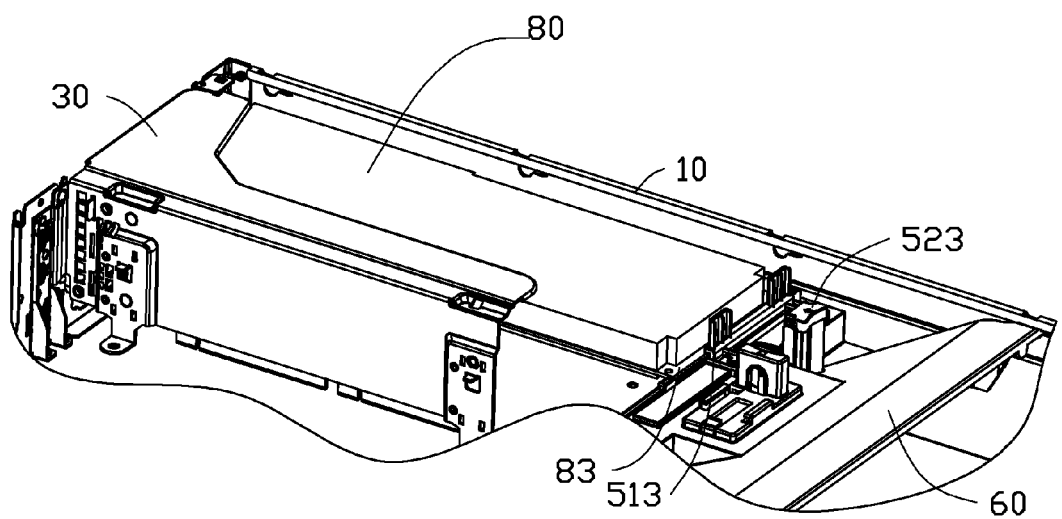
FIG. 6 is similar to FIG. 5, but viewed from another aspect.

Referring to FIG. 4, the securing bracket 60 includes a bracket body 61, two mounting plates 62 extending from the bracket body 61, an engaging plate 63 extending from the bracket body 61, and two resilient tabs 64 extending from the bracket body 61. Each of the two mounting plates 62 defines a through hole 621 corresponding to the first pivot post 5152. The engaging plate 63 defines two engaging openings 631 corresponding to the two engaging protrusions 5233. The engaging plate 63 is substantially perpendicular to the bracket body 61. An acute angle is defined between each of the two resilient tabs 64 and the bracket body 61.

Referring to FIGS. 3 to 6, in assembly, the two second pivot portions 525 of the securing element 52 are pressed towards the second base panel 521 to enable two of the second pivot posts 5252 to extend into two of the pivot holes 5141 of the pressing element 51. The two first pivot portions 515 of the pressing element 51 are pressed towards the first base panel 511 to enable two of the first pivot posts 5152 to extend into the through holes 621 of the securing bracket 60. By these means, the securing member 50 is mounted to the securing bracket 60. The two resilient tabs 64 resiliently resist the pressing element 51. The securing bracket 60 is secured to the bottom panel 11 of the enclosure 10 by a plurality of fasteners (not shown).

The inserting portion 855 of the PCI card 80 is received in the plurality of openings 37 and the inserting end of the PCI card 80 is inserted into the converting slot 22 of the converting card 20. The mounting portion 851 abuts the blocking tab 36.

The second end 83 of the PCI card 80 is placed on the bracket body 61. The pressing portion 513 of the pressing element 51 is placed on the second end 83. The securing element 52 is rotated to enable the two engaging protrusions 5233 of the securing element 52 to engage each of the two engaging openings 631 of the engaging plate 63. At this time, the second base panel 521 is pressing the first base panel 511. The second end 83 is located between the bracket body 61 and the pressing portion 513, being prevented thereby from moving in a direction substantially perpendicular to the bottom panel 11.

In disassembly, the handle portion 5232 of the securing member 50 is pulled in a direction which is substantially parallel to the PCI card 80, to disengage the two engaging protrusions 5233 from each of the two engaging openings 631. The pressing element 51 rotates away from the second end 83. Thus, the PCI card 80 is easily removable from the enclosure 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A mounting apparatus for a PCI card, comprising:
    an enclosure comprising a bottom panel;
    a mounting bracket configured to secure a first end of the PCI card;
    a securing bracket mounted on the bottom panel, the securing bracket comprising a bracket body and an engaging plate extending from the bracket body; and
    a securing member, the securing member comprising a pressing element pivotably mounted to the securing bracket and a securing element pivotably mounted on the pressing element, the securing element engaging with the engaging plate to enable the pressing element to press a second end opposite to the first end of the PCI card to move the second end of the PCI card between the bracket body and the pressing element;
    wherein the pressing element comprises a first base panel and a pressing portion extending from the first base panel; the securing element comprises a second base panel and a securing portion extending from the second base panel; the securing portion is configured to engage the engaging plate so that the second base panel presses the first base panel, thereby the pressing portion presses the second end of the PCI card; the pressing element further comprises two first pivot portions; each of the two first pivot portions comprises a first connecting arm extending from the first base panel and a first pivot post extending from the first connecting arm; the securing bracket further comprises two mounting plates; each of the two mounting plates defines a through hole, the through hole is configured to receive the first pivot post; the securing bracket further comprises a resilient tab extending from the bracket body; an acute angle is maintained between the resilient tab and the bracket body; the resilient tab is located between the two mounting plates; and the resilient tab resists resiliently the pressing element.

2. The mounting apparatus of claim 1, wherein the securing element comprises two second pivot portions; each of the two pivot portions comprises a second connecting arm extending from the second base panel and a second pivot post extending from the second connecting arm; the pressing element further comprises two mounting tabs extending from the first base panel; and each of the two mounting tabs defines a pivot hole, the pivot holes is configured to receive the second pivot post.

3. The mounting apparatus of claim 2, wherein the pressing element further comprises two positioning portions extending from the first base panel; and each of the two positioning portions is between the second base panel and the second connecting arm when the second base panel presses the first base panel.

4. The mounting apparatus of claim 1, wherein the securing portion comprises a connecting portion extending from the second base panel, a handle portion extending from the connecting portion, and an engaging protrusion extending from the connecting portion; the engaging plate of the securing bracket defines an engaging opening configured to engage the engaging protrusion; and the handle portion is configured to drive the engaging protrusion to disengage from the engaging opening.

5. The mounting apparatus of claim 1, wherein the securing portion is L-shaped.

6. A PCI card assembly, comprising:
    an enclosure comprising a bottom panel and a side panel substantially perpendicular to the bottom panel;
    a PCI card substantially parallel to the bottom panel, the PCI card comprising a first end and a second end;
    a mounting bracket securing the first end of the PCI card and mounted to the side panel;
    a securing bracket mounted in the enclosure, the securing bracket comprising a bracket body and an engaging plate extending from the bracket body; and
    a securing member, the securing member comprising a pressing element pivotably mounted to the securing bracket and a securing element pivotably mounted on the pressing element, the securing element configured to rotate in a plane substantially perpendicular to the bottom panel to engage the engaging plate so that the pressing element is placed on the second end, thereby preventing the second end of the PCI card from moving in a direction substantially perpendicular to the bottom panel;
    wherein the pressing element comprises a first base panel and a pressing portion extending from the first base panel; the securing element comprises a second base panel and a securing portion extending from the second base panel; the securing portion is configured to engage with the engaging plate so that the second base panel presses the first base panel, thereby the pressing portion presses the second end of the PCI card; the securing element comprises two second pivot portions; each of the two pivot portions comprises a second connecting arm extending from the second base panel and a second pivot post extending from the second connecting arm; the pressing element further comprises two mounting tabs extending from the first base panel; each of the two mounting tabs defines a pivot hole, the pivot hole is configured to receive the second pivot post; the pressing element further comprises two positioning portions extending from the first base panel; and each of the two positioning portions is between the second base panel and the second connecting arm when the second base panel presses the first base panel.

7. The PCI card assembly of claim 6, wherein the pressing element further comprises two first pivot portions; each of the two first pivot portions comprises a first connecting arm extending from the first base panel and a first pivot post extending from the first connecting arm; the securing bracket further comprises two mounting plates; and each of the two mounting plates defines a through hole, the through holes is configured to receive the first pivot post.

8. The PCI card assembly of claim 7, wherein the securing bracket further comprises a resilient tab extending from the bracket body; an acute angle is defined between the resilient tab and the bracket body; the resilient tab is located between the two mounting plates; and the resilient tab resiliently resists the pressing element.

9. The PCI card assembly of claim 6, wherein the securing portion comprises a connecting portion extending from the second base panel, a handle portion extending from the connecting portion, and an engaging protrusion extending from the connecting portion; the engaging plate of the securing bracket defines an engaging opening configured to engage the engaging protrusion; and the handle portion is configured to drive the engaging protrusion to disengage from the engaging opening.

10. The PCI card assembly of claim 6, wherein the securing portion is L-shaped.

11. A mounting apparatus for a PCI card, comprising: an enclosure comprising a bottom panel; a mounting bracket configured to secure a first end of the PCI card; a securing bracket mounted on the bottom panel, the securing bracket comprising a bracket body, two mounting plates extending from the bracket body, an engaging plate extending from the bracket body, and a resilient tab extending from the bracket body; and each of the two mounting plates defines a through hole; and a securing member, the securing member comprising a pressing element pivotably mounted to the securing bracket and a securing element pivotably mounted on the pressing element, the securing element engaging with the engaging plate to enable the pressing element to press a second end opposite to the first end of the PCI card to move the second end of the PCI card between the bracket body and the pressing element; the pressing element comprising two first pivot portions; each of the two first pivot portions comprises a first connecting arm extending from a first base panel of the pressing element and a first pivot post extending from the first connecting arm; the first pivot post received in the through hole; wherein an acute angle is maintained between the resilient tab and the bracket body; the resilient tab is located between the two mounting plates, and the resilient tab resists resiliently the pressing element.

* * * * *